US012734779B2

(12) United States Patent
Cho

(10) Patent No.: US 12,734,779 B2
(45) Date of Patent: Sep. 15, 2026

(54) METHOD FOR MANUFACTURING FOOD PACKAGING PAPER TRAY THAT CAN BE EASILY SEPARATED AND DISCARDED

(71) Applicant: Young Soo Han, Gwacheon-si (KR)

(72) Inventor: In Seok Cho, Bucheon-Si (KR)

(73) Assignee: Young Soo Han, Gwacheon-si (KR)

( * ) Notice: Subject to any disclaimer, the term of this patent is extended or adjusted under 35 U.S.C. 154(b) by 107 days.

(21) Appl. No.: 18/835,326

(22) PCT Filed: Jan. 19, 2023

(86) PCT No.: PCT/KR2023/000942
§ 371 (c)(1),
(2) Date: Aug. 1, 2024

(87) PCT Pub. No.: WO2023/158119
PCT Pub. Date: Aug. 24, 2023

(65) Prior Publication Data

US 2025/0214314 A1 Jul. 3, 2025

(30) Foreign Application Priority Data

Feb. 18, 2022 (KR) ........................ 10-2022-0021271
Jul. 7, 2022 (KR) ........................ 10-2022-0083505

(51) Int. Cl.
*B31B 50/74* (2017.01)
*B31B 50/14* (2017.01)
(Continued)

(52) U.S. Cl.
CPC ............ *B31B 50/742* (2017.08); *B31B 50/14* (2017.08); *B31B 50/46* (2017.08); *B31B 2100/0024* (2017.08); *B31B 2120/404* (2017.08)

(58) Field of Classification Search
CPC ....... B31B 50/742; B31B 50/14; B31B 50/46; B31B 2120/404; B31B 2100/0024; B31B 50/592
See application file for complete search history.

(56) References Cited

U.S. PATENT DOCUMENTS 2,736,065 A * 2/1956 Wilcox .................. B29C 51/04
264/269
3,104,012 A * 9/1963 Beamish ................ B65D 77/22
206/525
(Continued)

FOREIGN PATENT DOCUMENTS

JP 2003-053858 A 2/2003
KR 20-0339704 Y1 1/2004
(Continued)

OTHER PUBLICATIONS

International Search Report received in International Application No. PCT/KR2023/000942, dated Apr. 14, 2023, in 6 pages.
(Continued)

*Primary Examiner* — Joshua G Kotis
(74) *Attorney, Agent, or Firm* — Knobbe, Martens, Olson & Bear, LLP

(57) ABSTRACT

According to a method for manufacturing a food packaging paper tray that can be easily separated and discarded, the paper tray is manufactured with paper of a predetermined thickness, and the bottom surface, wall surfaces and outward flange of the paper tray are coated (attached) with the synthetic resin oriented film, and thus the firm exterior shape thereof is maintained, and sealing and packaging thereof are possible by means of the sealing and packaging machine using thermoplastic films through the outward flange to which the synthetic resin oriented film is attached. Particularly, the synthetic resin oriented film is adhered, while stretched, to the bottom surface, wall surfaces and outward
(Continued)

flange of the paper tray through an adhesive applied to the lower surface thereof, so as to ensure the waterproof function of the paper tray, and can be easily separated from the paper tray if pulled by applying artificial power.

6 Claims, 10 Drawing Sheets

(51) Int. Cl.

| | |
|---|---|
| ***B31B 50/46*** | (2017.01) |
| ***B31B 100/00*** | (2017.01) |
| ***B31B 120/40*** | (2017.01) |

(56) References Cited

U.S. PATENT DOCUMENTS

| | | | | |
|---|---|---|---|---|
| 4,257,530 | A * | 3/1981 | Faller | B65B 9/04 229/905 |
| 4,325,905 | A * | 4/1982 | Takahashi | B65D 3/12 264/516 |
| 4,533,065 | A * | 8/1985 | Chazal | B29C 51/165 229/110 |
| 4,555,381 | A * | 11/1985 | Chazal | B29C 51/165 264/516 |
| 5,533,622 | A * | 7/1996 | Stockley, III | B65D 75/366 229/123.1 |
| 5,577,989 | A * | 11/1996 | Neary | B65D 65/403 493/902 |
| 6,527,687 | B1 * | 3/2003 | Fortney | B31B 50/16 493/56 |
| 8,534,460 | B2 * | 9/2013 | Wnek | B65G 59/066 206/518 |
| 11,214,394 | B2 * | 1/2022 | Palumbo | B29C 66/91445 |
| 11,565,863 | B2 * | 1/2023 | Mondini | B31B 50/44 |
| 2002/0193222 | A1 * | 12/2002 | Dai | B27N 3/08 493/143 |
| 2009/0232926 | A1 * | 9/2009 | Sofronie | B29C 43/36 425/394 |
| 2011/0193264 | A1 * | 8/2011 | Li | B29C 43/003 264/318 |
| 2013/0327821 | A1 * | 12/2013 | Zwaga | B65D 1/22 53/403 |
| 2016/0288445 | A1 * | 10/2016 | Räsänen | B31F 1/0077 |
| 2018/0319568 | A1 * | 11/2018 | Tye | B65D 77/286 |
| 2020/0047975 | A1 * | 2/2020 | Tye | B65D 21/0233 |
| 2021/0164163 | A1 * | 6/2021 | Statelman | B32B 33/00 |
| 2022/0289459 | A1 * | 9/2022 | Kastanek | B65D 5/48022 |
| 2023/0264849 | A1 * | 8/2023 | Tye | B65D 5/20 206/557 |

FOREIGN PATENT DOCUMENTS

| | | | | |
|---|---|---|---|---|
| KR | 10-2017-0045935 | A | 4/2017 | |
| KR | 10-2017-0089071 | A | 8/2017 | |
| KR | 10-2479417 | B1 | 12/2022 | |
| KR | 10-2479418 | B1 | 12/2022 | |
| WO | WO-9828195 | A1 * | 7/1998 | B65D 77/2024 |
| WO | WO-9967143 | A2 * | 12/1999 | B31B 50/44 |
| WO | WO-2015009518 | A1 * | 1/2015 | B65D 25/14 |
| WO | WO 2019/177652 | A1 | 9/2019 | |

OTHER PUBLICATIONS

Written Opinion of the ISA received in International Application No. PCT/KR2023/000942, dated Apr. 13, 2023, in 3 pages.

* cited by examiner

METHOD FOR MANUFACTURING FOOD PACKAGING PAPER TRAY THAT CAN BE EASILY SEPARATED AND DISCARDED

TECHNICAL FIELD

The present invention relates to a method of manufacturing a paper tray for food packaging that is easy to be disposed of for recycling. More specifically, the present invention relates to a method for manufacturing a paper tray for food packaging that is easy to be separated and disposed of by making a tray frame (body) from paper, which is an environmentally friendly material, and coating (attaching) the inner surface of the body with an adhesive synthetic resin stretch film to secure water proof function while enabling the sealed packaging.

BACKGROUND ART

In general, food products for delivery or for sale in stores and the like are mostly packaged to protect them from physical or chemical damage, spoilage, or contamination that may occur during transportation and storage. Disposable packaging made of synthetic resin is used to package these foods. In other words, the food products are placed in a disposable packaging container and a thermoplastic film (i.e., sealing film) is heat fused to the rim of the opening to seal the container. This is because that the use of disposable packaging made of synthetic resins make it possible to safely package wet and fragile foods, as well as seal them with a thermoplastic film. However, it is difficult recycle single-use plastic packaging if it is not collected cleanly, and thus most of them are not recycled, causing serious environmental pollution.

DISCLOSURE

Technical Tasks

The present invention aims to solve these problems; the object of the present invention is to provide a method for manufacturing a paper tray for food packaging that is easy to be separated and disposed of by making a frame (body) of a tray for food packaging using paper, which is an environmentally friendly material, and coating (attaching) the inner surface of the body with a synthetic resin stretch film treated with an mordant (removable adhesive), thereby securing a waterproof function and enabling a sealed packaging through a sealing machine using a thermoplastic film.

Other object of the present invention is to provide a method for manufacturing a paper tray for food packaging that is easy to be separated and disposed of by attaching a stretch film to the inner surface of the paper tray in a way to be easily separated from the paper tray. Thus, the stretch film made of synthetic resin can be conveniently removed from the tray made of environmentally-friendly paper and be disposed of for recycling so as to increase resource recycling and reduce problems associated with environmental pollution.

Still other object of the present invention is to provide a method for manufacturing a paper tray for food packaging that is easy to be separated and disposed of by attaching a synthetic resin stretch film treated with a mordant more easily so as to improve the productivity.

Technical Solution

To achieve the above objectives, it is characterized that the present invention provides a method for manufacturing a paper tray for food packaging that is easy to be separated and disposed of, which comprises the steps of: in the method for manufacturing a paper tray for food packaging that is easy to be separated and disposed of, in which the food can be sealed and packaged through a sealing machine using a thermoplastic film, a blanking step of cutting out a paper tray in a shape of an unfolded diagram from a base paper of a predetermined thickness, the unfolded diagram having a quadrilateral bottom surface serving as a bottom, four wall surfaces extending from each side of the quadrilateral bottom, each of the four wall surfaces being foldable through partial cut-and-fold lines at each side of the bottom surface to serve as walls, and an outward flange being foldable outwardly through a half-cutting line at the top of the wall surfaces to serve as an adhesive portion of a thermoplastic film; forming a paper tray in which a tray is formed by placing the paper tray in the shape of the unfolded diagram made in the above blanking step on a base mold, the base mold having a tray-receiving part having a bottom and wall surfaces identical to the outer shape of the paper tray with an open top, and by pressing the bottom surface downwardly from top such that the four wall surfaces are folded upwardly at each side of the bottom surface, while folding the outward flanges horizontally from the top of the wall surfaces toward the outside to form the body shape of the paper tray, attaching a stretch film in which a sheet of synthetic resin stretch film treated with a mordant on the back side facing the tray is placed to cover the top of the paper tray received in the tray-receiving part of the base mold and then is pressed onto an top surface of the outward flanges of the paper tray through a film attachment mold, while cutting the sheet of the synthetic resin stretch film along the edge of the outward flanges; coating the tray with a stretch film in which, while the outward flanges are pressed and fixed on the top surface of the base mold through the film attachment mold after the stretch film attachment step, the central part of the synthetic resin stretch film covering the opening of the paper tray is pressed down through a film coating-plug mold made identical to the internal shape of the paper tray to stretch and paste the synthetic resin stretch film on the bottom and wall surfaces of the paper tray; and an ejection step for ejecting and stacking the paper tray coated with the synthetic resin stretch film from the base mold after the stretch film coating step.

Still the present method for manufacturing a paper tray for food packaging that is easy to be separated and disposed of is characterized that the film-attachment mold and the film-coating-plug mold are preheated to 100-140° C. to apply heat to the synthetic resin stretch film in the stretch film attachment step and stretch film coating step.

Still the present method for manufacturing a paper tray for food packaging that is easy to be separated and disposed of is characterized that the internal air of the paper tray and the base mold is forced out through a vacuum pump so that the synthetic resin stretch film can be attached easily to the bottom wall surfaces of the paper tray in the stretch film coating step.

Still the present method for manufacturing a paper tray for food packaging that is easy to be separated and disposed of is characterized that an air pressure is applied from the top of the synthetic resin stretchable film toward the bottom so that the synthetic resin stretch film easily attaches to the bottom and wall surfaces of the paper tray while the film is stretched in the stretch film coating step.

Still the present method for manufacturing a paper tray for food packaging that is easy to be separated and disposed of is characterized that the sheet of the synthetic resin stretch film fabric is preheated to 140-180° C. by a heater in the stretch film attachment step.

Advantageous Effects

According to the present method for manufacturing a paper tray for food packaging that is easy to be separated and disposed of, the present paper tray manufactured using a predetermined thickness of paper and coated (attached) with a synthetic resin stretch film throughout the bottom and wall surfaces and outward flanges has an advantage that the shape of the paper tray is maintained firmly, and the outward flange to which the synthetic resin stretch film is attached enables a sealed packaging through a sealing machine using a thermoplastic film. In particular, while the synthetic resin stretch film attaches to the bottom, wall, and outward flange of the paper tray through a mordant treated on the underside thereof to provide the waterproof function of the paper tray, it can be easily peeled off from the paper tray by pulling it off applying an artificial force. Therefore, when the paper tray for food packaging is disposed of after use, it is beneficial to separate and dispose of the eco-friendly paper tray and the synthetic resin stretch film after peeling off the coated synthetic resin stretch film, thereby increasing the resource recycling and reducing environmental pollution. Therefore, when the present paper trays for food packaging are disposed of after use, it is advantageous that the resource recycling is increased and environmental pollution is reduced by discarding the present environmentally-friendly paper tray after peeling off the coated synthetic resin stretch film.

In addition, according to the present invention of a method for manufacturing a paper tray for food packaging that is easy to be separated and disposed of; it is advantageous that in the steps of attaching a stretch film and of coating the tray with the stretch film, the film attachment mold and the film coating-plug mold are preheated to 100-140° C. to apply heat to the synthetic resin stretch film, so that the synthetic resin stretch film stretches more smoothly and thus is uniformly attached to and coated on the bottom surface, wall surfaces, and outward flange of the paper tray.

In addition, according to the present invention of a method for manufacturing a paper tray for food packaging that is easy to be separated and disposed of; it is advantageous that by forcibly discharging the internal air of the paper tray and base mold through a vacuum pump during the stretch film coating step, the synthetic resin stretch film easily attaches to the bottom and wall surfaces of the paper tray without trapping any air bubbles.

In addition, according to the present invention of a method for manufacturing a paper tray for food packaging that is easy to be separated and disposed of; it is advantageous that by applying air pressure from the top of the synthetic resin stretch film toward the bottom at the stretch film coating step, the synthetic resin stretch film easily attaches to the bottom and wall surfaces of the paper tray while the film is stretched.

In addition, according to the present invention of a method for manufacturing a paper tray for food packaging that is easy to be separated and disposed of; it is advantageous that by preheating the adhesive-treated synthetic resin stretch film to 140-180° C. through a heater and then sequentially performing the stretch film attachment step and the stretch film coating step, the synthetic resin stretch film can be stretched easily smoothly, thus reducing the time performing the stretch film coating step, and increasing productivity and enabling mass production.

| Description of the numerals | |
|---|---|
| 100. paper tray | 110. bottom surface |
| 111. partial cut-and-fold line | 120. wall surface |
| 121. half-cutting line | 130. outward flange |
| 200. stretch film | 210. heater |
| 300. mordant | 400. base mold |
| 410. tray receiving part | 500. film attachment mold |
| 600. film coating-plug mold | 700. vacuum pump |
| 800. air compressor | S10. Blanking step |
| S20. Paper tray- forming step | S30. Stretch film attachment step |
| S40. Stretch film coating step | S50. Ejection step |

EMBODIMENTS

Hereinafter, preferred embodiments according to the present invention is described in detail with reference to the accompanying drawings.

<Detailed Description of the Elements of a Paper Tray for Food Packaging According to the Present Invention>

Figure 1:
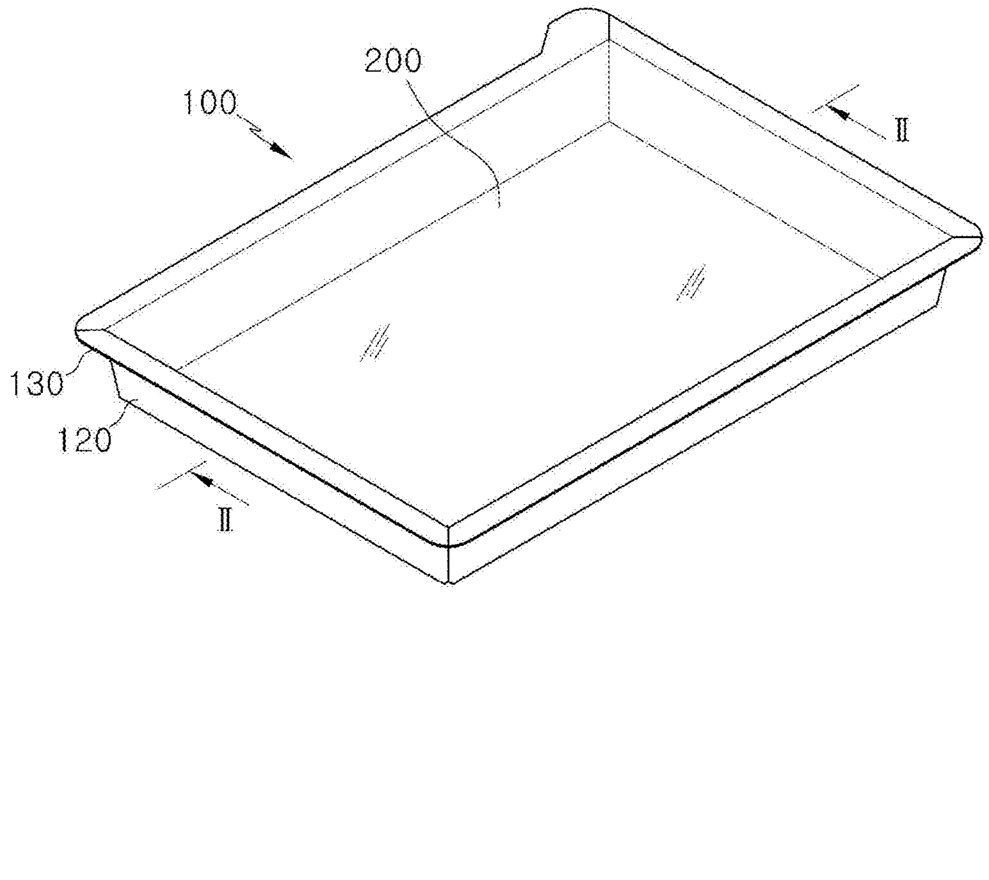
FIG. 1 is a perspective view of a paper tray for food packaging that is easy to be separated and disposed of according to the present invention.
Figure 2:
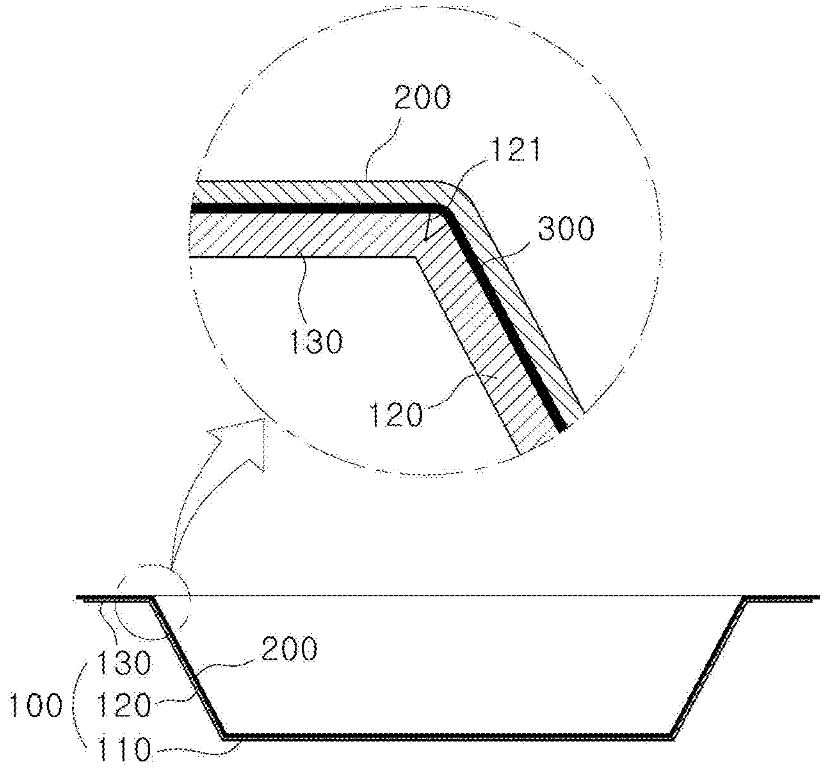
FIG. 2 is a cross-sectional view along lines II-II of FIG. 1, showing a cross-sectional structure of a paper tray for food packaging according to the present invention.

Referring to FIGS. 1 and 2, a paper tray 100 for food packaging according to the present invention is for sealing and packaging food such as various side dishes, food, delivery food, and the like through a sealing packaging device using a thermoplastic sealing sheet (sealing film); it is made of paper and has a bottom surface, four wall surfaces 120, and an outward flange 130, and is open at the top. The inner surface of such paper tray 100 is coated (attached) with a synthetic resin stretch film 200 to maintain the shape of the paper tray 100 while securing a waterproof function.

Figure 3:
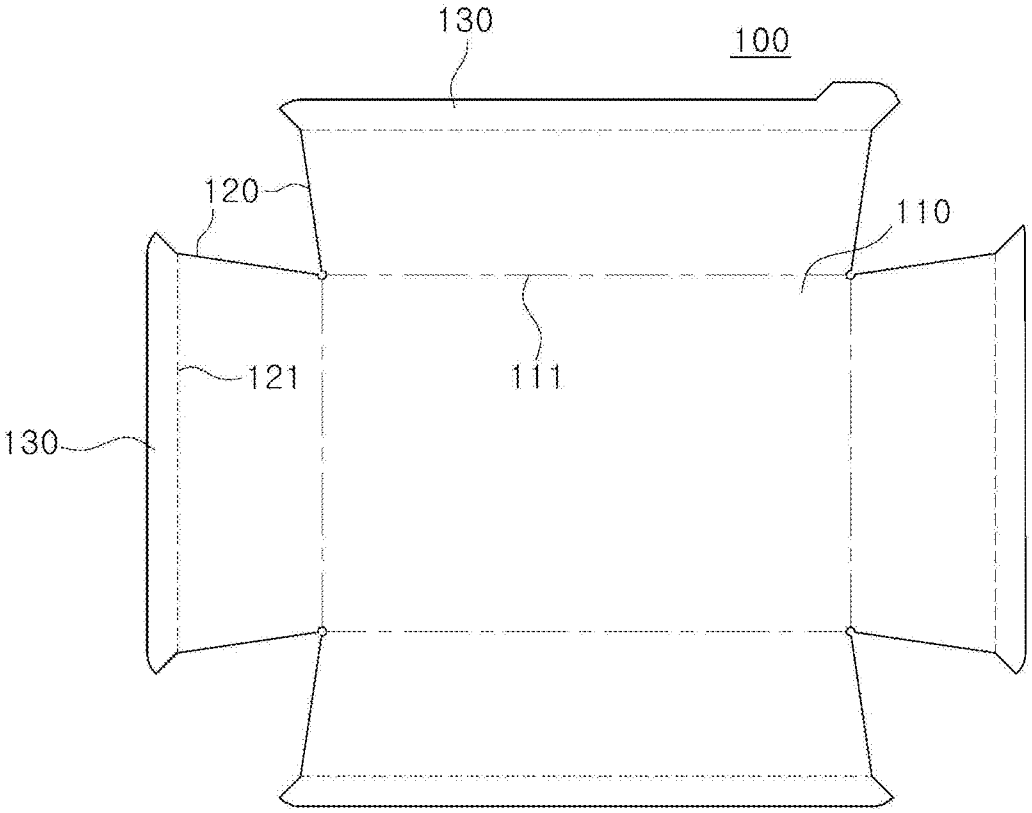
FIG. 3 is an unfolded diagram of a paper tray for food packaging according to the present invention.

Again, a paper tray 100 for food packaging according to the present invention comprises a quadrilateral bottom surface 110 serving as a bottom, four wall surfaces 120 each configured to be folded inclined upwardly through partial cut-and-fold lines 111 at each side of the bottom surface 110 to serve as walls, and an outwardly facing flange 130 configured to be folded outwardly through a half-cutting line 121 at the top of the four wall surfaces 120 to serve as an adhesive portion of the thermoplastic film. This paper tray 100 is made by tearing an unfolded form of the paper tray from a sheet of paper and folding via Thompson processing to provide a bottom surface 110, four wall surfaces 120, and an outwardly facing flange 130, as shown in FIG. 3. The four wall surfaces 120 are partially cut at the four sides of the bottom surface 110 via partial cut-and-fold lines 111, but also are partially connected, in order to facilitate upright folding without being separated from the bottom surface 110.

Furthermore, the bottom surface 110 and the inner surface of the wall surfaces 120 and the top surface of the outward flanges 130 of the paper tray 100 are coated with a synthetic resin stretch film 200, thus the paper tray 100 is waterproof and maintains its shape, and food products can be packaged and sealed in the paper tray 100 through a sealing device using a thermoplastic film (i.e., a sealing film). The paper tray 100 for food packaging according to the present invention is made by tearing off the paper tray 100 from a hygienic and eco-friendly pulp monolayer base paper in an unfolded form, and continuously feeding the tray to a paper tray molding coating device to make a paper tray 100.

<Description of a Manufacturing Method of a Paper Tray for Food Packaging According to the Present Invention>

The following describes the manufacturing method of a paper tray for food packaging according to the present invention, as described above, with reference to the accompanying drawings.

Figure 4:
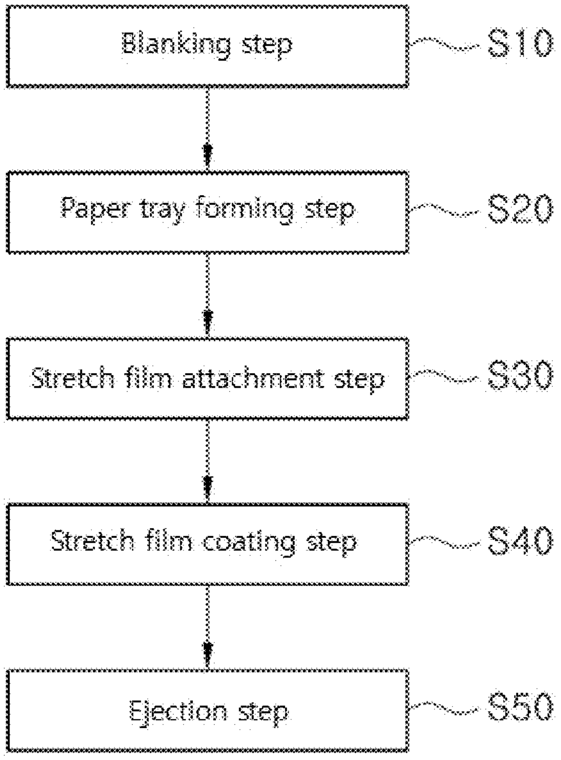
FIG. 4 is a process block diagram sequentially illustrating a method of manufacturing a paper tray for food packaging according to the present invention.

As shown in FIG. 4, the method of manufacturing a paper tray for food packaging according to the present invention comprises blanking step S10 in which a paper tray 100 is torn off from a base paper in an unfolded form so that a paper tray is constructed by folding it; a paper tray folding step S20 in which the paper tray 100 in the unfolded shape made in the blanking step (S10) is placed on a base mold 400 and pressed to form a body shape; a stretch film attachment step (S30) in which a synthetic resin stretch film (200) is attached and cut along the outward flange (130) while covering the upper part of the paper tray (100) received in the base mold (400); after the stretch film attachment step S30, a stretch film coating step S40 in which a central portion of the synthetic resin stretch film 200 covering the open area of the paper tray 100 is pressed so that the bottom surface 110 and the wall surface 120 of the paper tray 100 are coated with the film 200; and an ejection step S50 in which the paper tray 100 coated with the synthetic resin stretch film 200 is ejected from the base mold 400 and stacked.

The blanking step S10 is a process of tearing off the paper tray 100 from the base paper in an unfolded form so that the paper tray 100 is constructed by folding it, as shown in FIG. 3. The base paper used may be a single-layer pulp paper, corrugated cardboard, or the like. The paper tray 100 is torn off from such a base paper through a wood mold into a foldable form (so-called "Thompson process"), and in an embodiment of the present invention, the paper tray 100 has a quadrilateral bottom surface 110 that serves as a bottom, four wall surfaces 120 each foldable inclined upwardly through a partial cut-and-fold line 111 at each side of the bottom surface 110 to serve as walls, and an outwardly facing flange 130 at the top of each of the four wall surfaces 120 that is foldable outwardly through a half-cut line 121 to serve as an adhesive part for the thermoplastic film.

Figure 5:
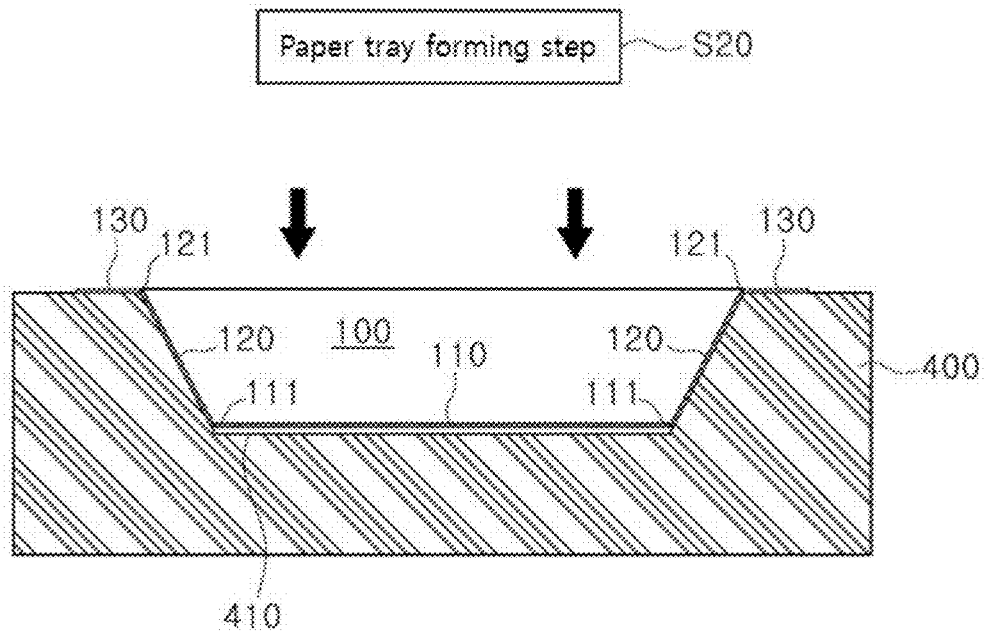
FIG. 5 is a schematic illustration of a paper tray forming step in a paper tray manufacturing method according to the present invention.

And the paper tray molding step S20 as shown in FIG. 5 is a process where the paper tray 100 in the form of an unfolded diagram made in the blanking step S10 is placed on the base mold 400 having a tray-receiving portion 410 with an open top, a bottom and walls identical to the external shape of the paper tray 100, and the bottom surface 110 of the tray 100 is pressed down from the top so that the four wall surfaces 120 are folded upward at each side of the bottom surface 110, and the outward flange 130 is folded horizontally from the top of the wall surface 120 toward the outside to form the body shape of the paper tray 100. In the paper tray molding step S20, the paper tray 100 in the form of an unfolded diagram is received in the tray-receiving portion 410, and the four wall surfaces 120 are folded inclined upwardly along the partial cut-and-fold line 111, and the outward flange 130 is spread by folding the outward flange 130 horizontally from the top of the four wall surfaces 120 toward outside through the half-cutting line 121.

Figure 6:
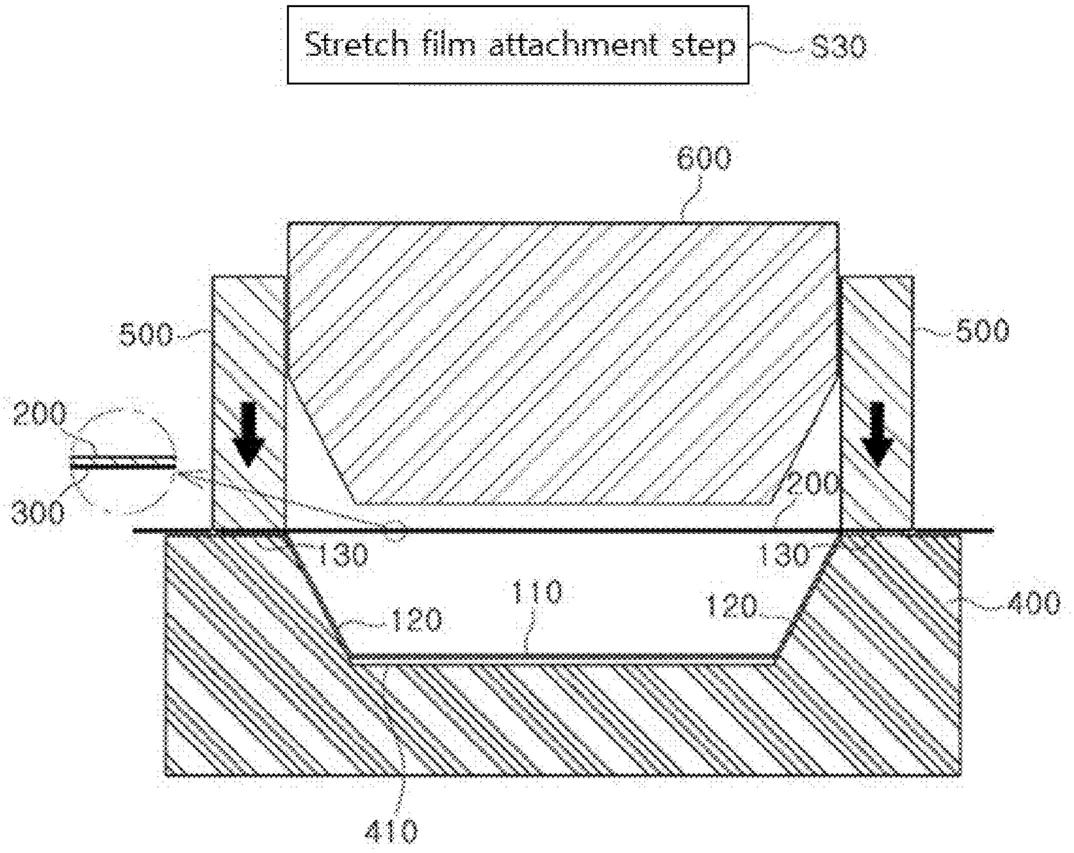
FIG. 6 is a schematic illustration of a step of attaching a stretch film in a paper tray manufacturing method according to the present invention.
Figure 7:
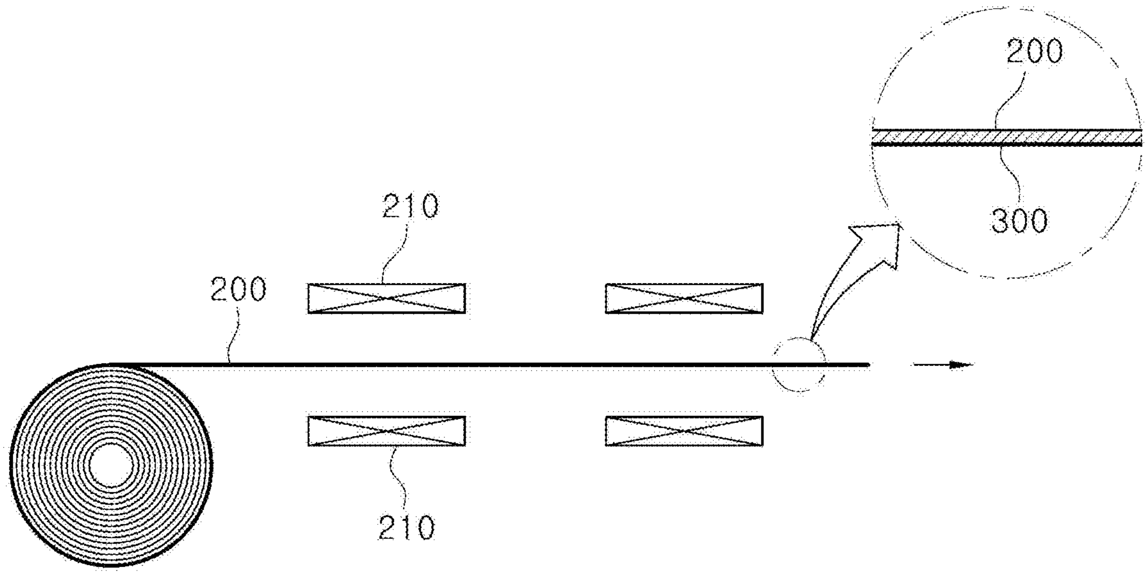
FIG. 7 is a schematic illustration of a preheating process of the synthetic resin stretched film used in the present invention.

The stretch film attachment step S30 as shown in FIG. 6 is a process where a sheet of synthetic resin stretched film 200 treated on its underside with a mordant (removable adhesive) 300 is placed to cover the top of the paper tray 100 received in the tray-receiving part 410 of the base mold 400, and then the sheet of synthetic resin stretch film 200 is cut along the edge of the outward flange 130 while the sheet of synthetic resin stretch film 200 is pressed attached onto the upper surface of the outward flange 130 of the paper tray 100 using the film attachment mold 500. As shown in FIG. 7; the synthetic resin stretch film 200 is wound in the form of a roll. It is preferable that the roll is preheated by a heater 210 to 140 to 180° C. while the roll is unwound before being fed to the stretch film attachment step S30. This is so that the synthetic resin stretch film 200 can be stretched and attached smoothly without difficulty in the stretch film coating step S40 following the stretch film attachment step S30. Furthermore, in the stretch film attachment step S30, the film attachment mold 500 is preheated to 100 to 140° C. (in one embodiment of the present invention, it is set to 120° C.) by a heater (not shown), so that the synthetic resin stretch film 200 is attached while pressed onto the outward flange 130 and while heat is applied to the synthetic resin stretch film 200. Thus, the synthetic resin stretch film 200 is easily attached to the outward flange 130 of the paper tray 100 through the mordant 300 treated on its underside.

Figure 8:
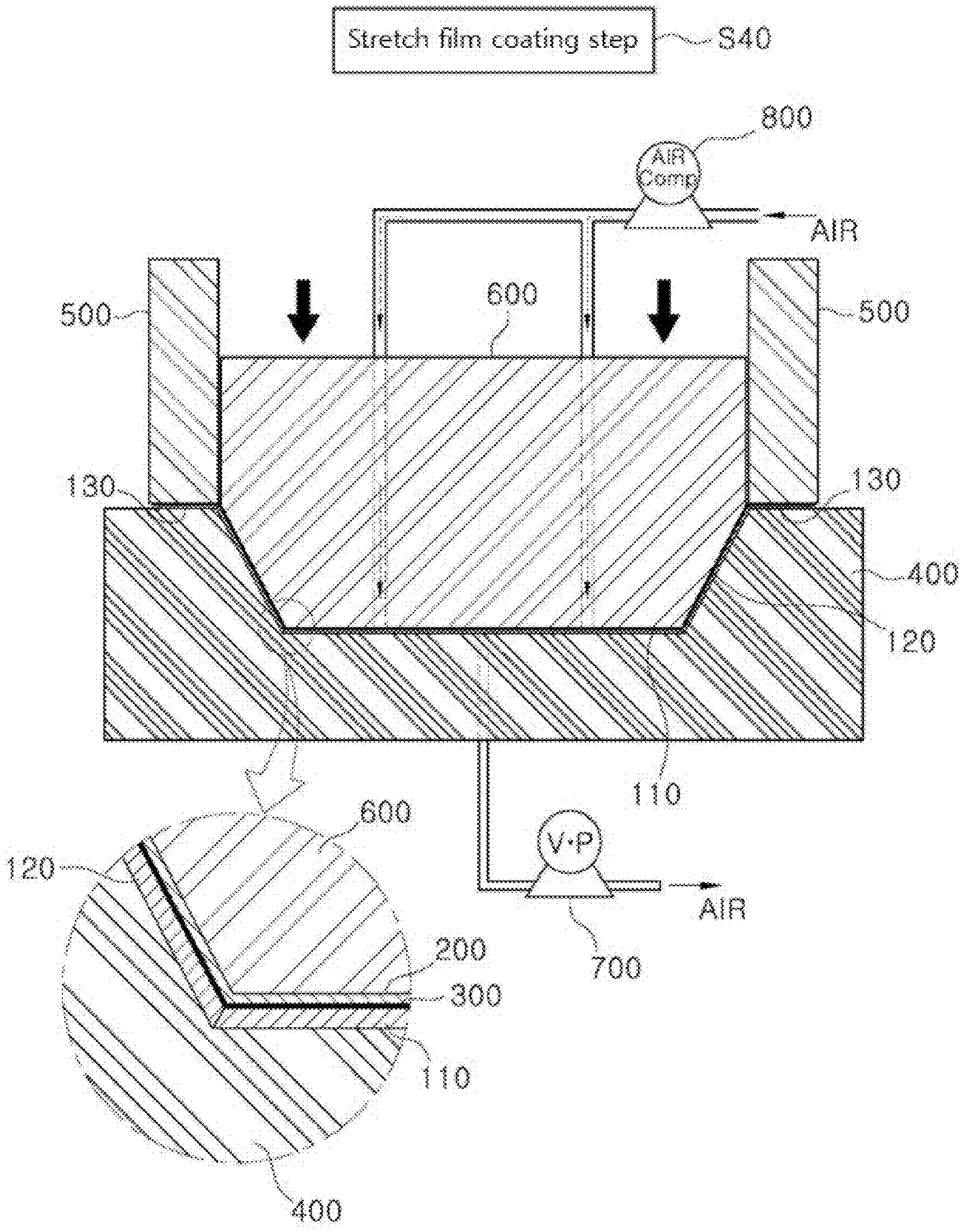
FIG. 8 is a schematic illustration of a stretch film coating step in a paper tray manufacturing method according to the present invention.

The stretch film coating step S40 as shown in FIG. 8 is a process where, following the stretch film attachment step S30, while the outward flange 130 is pressed and fixed on the top surface of the base mold 400 through the film attachment mold 500, and the central portion of the synthetic resin stretch film 200 covering the opening of the paper tray 100 is pressed downward using film-coating plug mold 600 made identical to the internal shape of the paper tray 100 so that the bottom surface 110 and wall surfaces 120 are coated with the synthetic resin stretch film 200 while the film is stretched. In the process of performing the stretch film coating step S40, the synthetic resin stretch film 200 is preheated, so that it can be stretched smoothly without difficulty, thereby reducing the coating process time and increasing work productivity. Furthermore, in the stretch film coating step S40, the film coating-plug mold 600 is also preheated to 100 to 140° C. (in one embodiment of the present invention, it is set to 120° C.) by a heater (not shown), so that the preheated synthetic resin stretch film 200 is heated and stretched smoothly without difficulty and press-attached to the bottom surface 110 and wall surface

120 of the paper tray 100. Thus, the synthetic resin stretch film 200 is more easily attached to the bottom surface 110 and wall surface 120 of the paper tray 100 through the mordant 300 treated on its underside. In this stretch film coating step S40, the air inside the paper tray 100 and the base mold 400 is forced out through a vacuum pump 700 to ensure that the synthetic resin stretch film 200 stretches and firmly attaches to the bottom surface 110 and the wall surface 120 of the paper tray 100 without trapping any bubbles. Furthermore, in the stretch film coating step S40, the air compressor 800 is used to apply air pressure to the synthetic resin stretch film 200 downwardly from the top of the synthetic resin stretch film 200, so that the synthetic resin stretch film 200 can be easily attached to the bottom surface 110 and the wall surface 120 of the paper tray 100 as the synthetic resin stretch film 200 is stretched.

Figure 9:
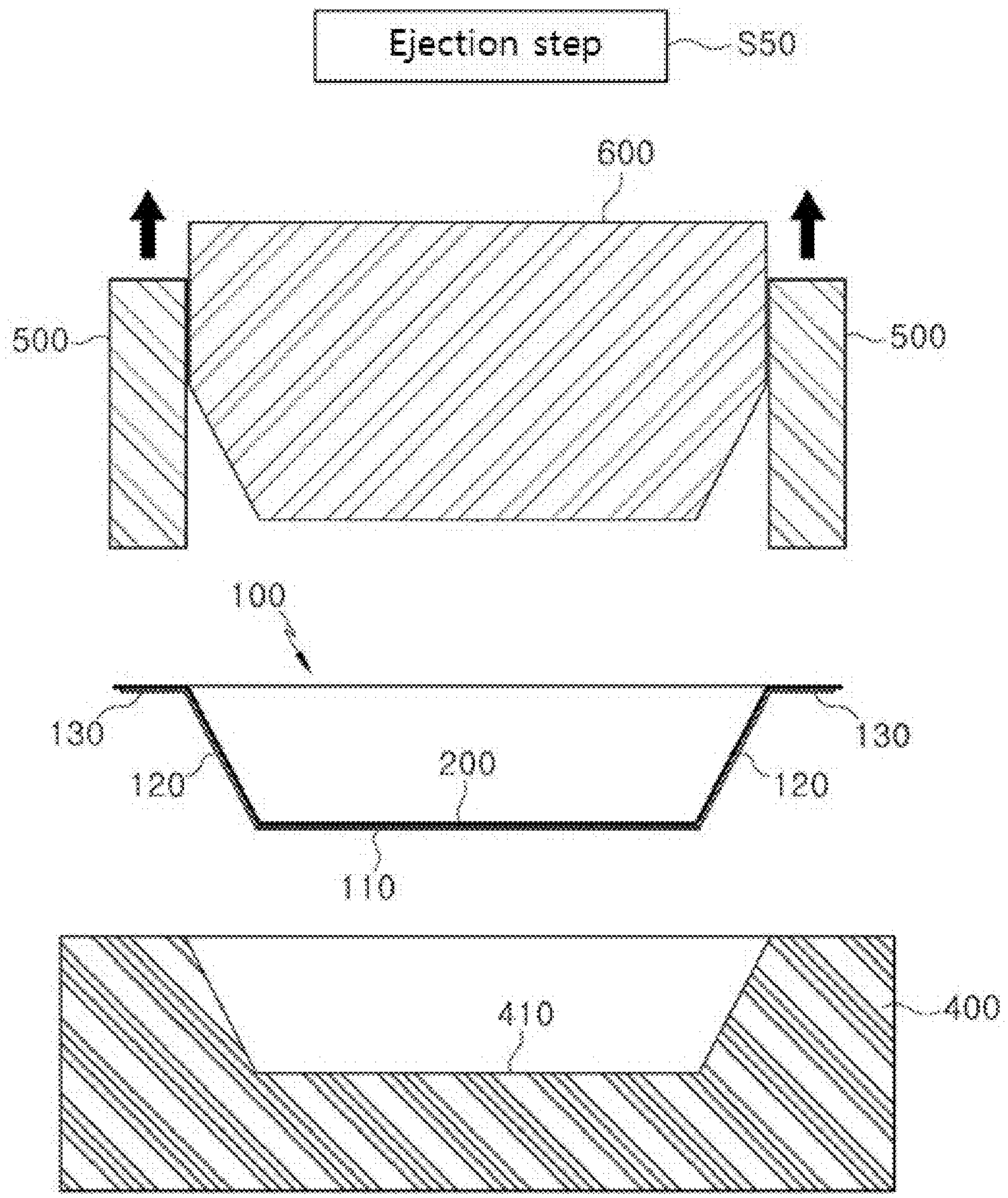
FIG. 9 is a schematic illustration of an ejection step in a paper tray manufacturing method according to the present invention.

The ejection step S50 is a process in which the paper tray 100 coated with the synthetic resin stretch film 200 is automatically taken out from the base mold 400 after the stretch film coating step S40 and stacked through a pick-up means (not shown), as shown in FIG. 9.

In this way, the paper tray 100 for food packaging according to the present invention is manufactured by through a process including feeding the paper tray 100 made in the form of an unfolded diagram in the blanking step S10 to the base mold 400 and performing a paper tray forming step S20→a stretch film attachment step S30→a stretch film coating step S40→ and an ejection step S50. The paper tray 100 for food packaging made by the manufacturing method according to the present invention has a bottom surface 110, four inclined wall surfaces 120, and an outward flange 130, and a synthetic resin stretch film 200 is coated on the top of the bottom surface 110, the inclined wall surfaces 120, and the outward flange 130 through a mordant 300 to maintain the folded shape.

In particular, the paper tray 100 for food packaging according to the present invention is made by making a frame of the tray for food packaging with paper, which is an environmentally friendly material, and coating the inner surface (upper surface) thereof with an adhesive synthetic resin stretch film 200, so that sealed packaging is possible through a sealing packaging machine in which a thermoplastic film is used while securing a waterproof function.

Figure 10:
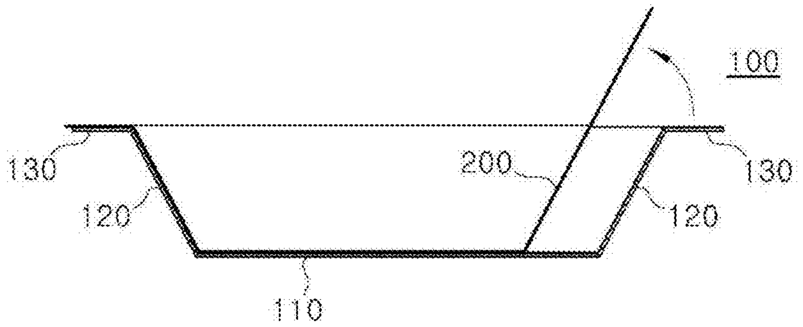
FIG. 10 is a schematic illustration of a paper tray according to the present invention with a portion of the stretch film removed for disposal after use.

Furthermore, when the paper tray for food packaging according to the present invention is discarded, the synthetic resin stretch film 200 attached to the inner surface (upper surface) of the paper tray 100 can be peeled off for separate disposal, as shown in FIG. 10. In other words, the synthetic resin stretch film 200 is attached to the bottom surface 110, the wall surface 120, and the outward flange 130 of the paper tray 100 through the mordant 300, and can be easily peeled off by applying some artificial force. Therefore, the paper tray 100 for food packaging can be disposed of for recycling after the synthetic resin stretch film 200 being removed, thereby increasing recycling of the resources and reducing environmental pollution.

INDUSTRIAL APPLICABILITY

The present invention has wide applications in the field of a method for manufacturing a paper tray for food packaging that is easy to be separated and disposed of in which the tray frame (body) is made of paper, which is an environmentally friendly material, and the inner surface is coated (attached) with an adhesive synthetic resin stretch film to secure a waterproof function while enabling sealed packaging.

The invention claimed is:

1. A method of manufacturing a paper tray, comprising a stretch film coated thereon, for food packaging that is to be separated from the stretch film and discarded, in which food products can be sealed and packaged through a sealing machine using a thermoplastic film, the method comprises:

- cutting out a paper tray blank in a shape of an unfolded diagram from a base paper of a predetermined thickness,
  - the paper tray blank comprising:
    - a bottom,
    - walls extending from the bottom, each of the walls being foldable along partial cut-and-fold lines disposed between the bottom and the walls, and
    - each wall comprising an outward flange being foldable outwardly along a half-cutting line at a top of each wall to serve as an attachment portion for the thermoplastic film;
- folding the paper tray blank to form a paper tray,
  - folding comprising:
    - placing the paper tray blank over a base mold, the base mold comprising a tray-receiving part having a shape corresponding to an outer shape of the paper tray, and
    - pressing the bottom of the paper tray blank downwardly such that the walls are folded upwardly at each side of the bottom while folding the outward flanges from the top of the walls toward the outside to form the paper tray;
- attaching a stretch film to the paper tray using a film attachment mold and a film coating-plug mold,
  - the stretch film comprising a sheet of synthetic resin film treated with an adhesive,
  - the film attachment mold comprising a first part and a second part,
  - the film coating-plug mold being located between the first part and second part of the film attachment mold and comprising a bottom portion with a shape corresponding to an internal shape of the paper tray, and
  - the attaching comprising:
    - placing the stretch film to cover the paper tray received in the tray-receiving part of the base mold,
    - moving the film attachment mold toward to the base mold to press-attach the stretch film to the outward flanges of the paper tray,
    - cutting the stretch film along edges of the outward flanges, and
    - in a state that the outward flanges are pressed by the film attachment mold and fixed between the film attachment mold and the base mold after attaching the stretch film to the outward flanges, moving the film coating-plug mold toward the base mold to:
      - press-down a central part of the stretch film covering the bottom and the walls of the paper tray,
      - stretch the stretch film, and
      - attach the stretch film to the bottom and the walls of the paper tray; and
- ejecting the paper tray coated with the stretch film from the base mold.

2. The method of claim 1, wherein the film attachment mold and the film coating-plug mold are preheated to 100-140° C. to apply heat to the stretch film when attaching the stretch film to the paper tray.

3. The method of claim 1, wherein when attaching the stretch film, an internal air of the paper tray and the base mold is forcibly discharged by a vacuum pump to facilitate attachment of the stretch film to the bottom and the walls of the paper tray.

4. The method of claim 3, wherein an air pressure is applied downwardly to the stretch film to facilitate attachment of the stretch film to the bottom and the walls of the paper tray while the stretch film is stretched.

5. The method of claim 1, wherein the stretch film is preheated to 140-180° C.

6. The method of claim 1, wherein the adhesive comprises mordant configured to allow a user to peel off for separate disposal.

* * * * *